United States Patent
Hamada et al.

(10) Patent No.: US 8,966,484 B2
(45) Date of Patent: Feb. 24, 2015

(54) INFORMATION PROCESSING APPARATUS, INFORMATION PROCESSING METHOD, AND STORAGE MEDIUM

(75) Inventors: Kei Hamada, Fukuoka (JP); Kouichirou Amemiya, Kawasaki (JP); Yasushi Kurokawa, Fukuoka (JP); Yumiko Ogata, Kitakyusyu (JP); Eitatsu Yoshida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 220 days.

(21) Appl. No.: 13/591,889

(22) Filed: Aug. 22, 2012

(65) Prior Publication Data

US 2013/0061229 A1 Mar. 7, 2013

(30) Foreign Application Priority Data

Sep. 1, 2011 (JP) ................................. 2011-190925

(51) Int. Cl.
G06F 9/46 (2006.01)
(52) U.S. Cl.
CPC ........................................ *G06F 9/46* (2013.01)
USPC ........... 718/100; 718/102; 718/104; 718/105; 718/106; 718/107
(58) Field of Classification Search
None
See application file for complete search history.

(56) References Cited

U.S. PATENT DOCUMENTS

| | | | |
|---|---|---|---|
| 6,993,762 B1 * | 1/2006 | Pierre ........................... | 718/102 |
| 2002/0087618 A1 * | 7/2002 | Bohm et al. .................. | 709/201 |
| 2010/0146245 A1 * | 6/2010 | Yildiz et al. .................. | 712/220 |
| 2010/0269102 A1 * | 10/2010 | Latorre et al. ................ | 717/130 |
| 2010/0274972 A1 * | 10/2010 | Babayan et al. .............. | 711/125 |
| 2011/0078700 A1 * | 3/2011 | Blackburn et al. ............ | 718/105 |
| 2011/0296212 A1 * | 12/2011 | Elnozahy et al. ............. | 713/320 |

FOREIGN PATENT DOCUMENTS

| | | |
|---|---|---|
| JP | 54-47545 | 4/1979 |
| JP | 9-69053 | 3/1997 |

* cited by examiner

*Primary Examiner* — Emerson Puente
*Assistant Examiner* — Dong Kim
(74) *Attorney, Agent, or Firm* — Staas & Halsey LLP

(57) ABSTRACT

An information processing apparatus makes a plurality of threads concurrently execute tasks stored in a task queue associated with the thread a prescribed number of times of execution. The information processing apparatus includes a processor that executes the plurality of threads that executes a procedure. The procedure includes generating a task from among a plurality of tasks into which a serial program processing corresponding to a processing request is divided, selecting the task queue associated with one of the plurality of threads, enqueuing the generated task to the selected task queue, dequeuing the enqueued task to the task queue associated with the thread, and executing the dequeued task.

14 Claims, 26 Drawing Sheets

FIG. 5

| FUNCTION POINTER | 0x804ed30 (ADDRESS OF REQUEST RECEPTION FUNCTION) |
|---|---|
| POINTER OF MESSAGE INFORMATION | 0x78ab974 |
| SEQUENCE NUMBER | 1 |

FIG. 6

| QUEUE NUMBER | ASSOCIATED THREAD | READ INDEX | WRITE INDEX | LARGEST ELEMENT NUMBER | QUEUE LEADING ADDRESS |
|---|---|---|---|---|---|
| QUEUE #1 | #1 | 0 | 0 | 1000 | 0xa17e7b90 |
| QUEUE #2 | #2 | 100 | 352 | 1000 | 0xa17f7b90 |

FIG. 7

| IDENTIFIER | 001 |
|---|---|
| TRANSMISSION SOURCE IP ADDRESS | 192.0.2.3 |
| TRANSMISSION SOURCE PORT | 5123 |
| DESTINATION IP ADDRESS | 192.0.2.1 |
| DESTINATION PORT | 80 |

FIG. 8A

| | 24 |
|---|---|
| DATA SIZE | 1483 |
| POINTER OF RECEPTION CONNECTION | 0xb7735eec |
| POINTER OF TRANSMISSION CONNECTION | NULL |
| LEADING ADDRESS OF DATA BODY | 0xb7735eec |
| IDENTIFIER | NULL |
| DESTINATION IP ADDRESS AND PORT | NULL |

FIG. 8B

LAYER 7 PROTOCOL HEADER
EXAMPLE:
HTTP HEADER
```
HTTP/1.1 /services/A1 ¥r¥n
Cookie: JSESSIONID=55D95DFFF39788A6729C2F74018AA23C; ¥r¥n
Content-Type: text/html;charset=ISO-8859-1 ¥r¥n
Content-Length: 1270 ¥r¥n
Date: Tue, 29 Jan 2008 12:38:25 GMT ¥r¥n
Server: Apache-Coyote/1.1 ¥r¥n
Connection: Keep-Alive ¥r¥n
```

MESSAGE CONTENTS
EXAMPLE:
SOAP ENVELOPE
```
<?xml version="1.0"?>
<soapenv:Envelope>
  <soapenv:Header>
   ...
  </soapenv:Header>
  <soapenv:Body>
    <getUserPresence>
      <From> user29876543 </From>
      <Presentity> sip:bob@example.com </Presentity>
      <Policy_Role> Manager </Policy_Role>
      <Item>
       ...
      </Item>
    </getUserPresence>
  </soapenv:Body>
</soapenv:Envelope>
```

FIG. 9

| IDENTIFIER EXTRACTION PART | FORMAT OF EXTRACTION POSITION |
|---|---|
| //presentity | Xpath |

FIG. 10

| IDENTIFIER | DESTINATION SERVER |
|---|---|
| sip:bob@example.com | 10.10.10.11:8080 |
| def234@10.10.10.9 | 10.10.10.12:8080 |
| sip:alice@example.com | 10.10.10.13:8080 |
| aaaabbbb.1 | 10.10.10.14:8080 |

FIG. 17

| FUNCTION OF TYING TARGET TASK | TIED FINAL TASK | | FINAL POSITION IN INVESTIGATED TASK QUEUE | |
|---|---|---|---|---|
| | ADDRESS | QUEUE | QUEUE #1 | QUEUE #2 |
| func_xxx | a7ce1b90 | #1 | 82 | 23 |

FIG. 25

| FUNCTION OF TYING TARGET TASK | TIED FINAL TASK ||
|---|---|---|
| | ADDRESS | QUEUE |
| func_xxx | a7ce1b90 | #1 |

INFORMATION PROCESSING APPARATUS, INFORMATION PROCESSING METHOD, AND STORAGE MEDIUM

CROSS-REFERENCE TO RELATED APPLICATIONS

This application is based upon and claims the benefit of priority from the prior Japanese Patent Application No. 2011-190925, filed on Sep. 1, 2011, the entire contents of which are incorporated herein by reference.

FIELD

The embodiments discussed herein are related to a technique for executing program processing by a multi-thread method.

BACKGROUND

A multi-thread method for executing program processing in a plurality of threads has been widely used by an information processing apparatus. By using the multi-thread method, concurrent processing is possible.

Thus, the processing performance of the information processing apparatus is improved. As for the multi-thread method, a technique for further improving the processing performance has been proposed. For example, there has been a technique for variably controlling the number of threads and queues according to a reception load state of a message. Further, for example, there has been a technique for displaying a specific processor that may effectively execute a task in task state information so that the task may be preferentially selected in a multiple processor system.

According to the multi-thread method, thread groups operating at the same time are given with an execution opportunity sequentially by scheduling of an Operating System (OS). At this time, when the number of threads increases, a processing cost for thread switching by the scheduling of the OS increases. If generating processing and discharging processing of threads are executed frequently, overhead is increased. If the above-described state occurs, the processing performance of the information processing apparatus is reduced.

SUMMARY

According to an aspect of the invention, an information processing apparatus makes a plurality of threads concurrently execute tasks stored in a task queue associated with the thread a prescribed number of times of execution. The information processing apparatus includes a processor that executes the plurality of threads that executes a procedure. The procedure includes generating a task from among a plurality of tasks into which a serial program processing corresponding to a processing request is divided, selecting the task queue associated with one of the plurality of threads, enqueuing the generated task to the selected task queue, dequeuing the enqueued task to the task queue associated with the thread, and executing the dequeued task.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is an explanatory diagram of an example of task data;

FIG. 6 is an explanatory diagram of an example of a task queue table;

FIG. 7 is an explanatory diagram of an example of connection information;

FIG. 8A is an explanatory diagram of an example of message information;

FIG. 8B is an explanatory diagram of a specific example of a message body;

FIG. 9 is an explanatory diagram of an example of an identification rule;

FIG. 10 is an explanatory diagram of an example of a transfer rule table;

FIG. 17 is an explanatory diagram of an example of tying task management data;

FIG. 25 is an explanatory diagram of an example of the tying task management data.

DESCRIPTION OF EMBODIMENTS

1. Overview of Embodiments

The technique described in the embodiments of the present specification intends to improve the processing efficiency at a time of program processing by an information processing apparatus applying a multi-thread method.

When the program processing is executed by the multi-thread method in the information processing apparatus, the OS usually executes scheduling and sequentially executes the respective threads that are concurrently operated. According to the above-described multi-thread method, if the number of threads increases, a processing cost for thread switching (context switch) by the scheduling executed by the OS increases. If the generation processing and the discharging processing of the threads are executed frequently, the overhead is increased.

According to the embodiments described in the present specification, a prescribed number of threads executing the program processing are concurrently executed (resident). In this case, the concurrent execution of the prescribed number of threads includes concurrent execution of the threads by a plurality of processors respectively without thread switching at least. According to the embodiments described in the present specification, the program processing is divided into a plurality of tasks. According to the embodiments described in the present specification, each of the divided tasks is enqueued to a task queue corresponding to one of the threads that are concurrently executed and is then executed sequentially.

Figure 1:
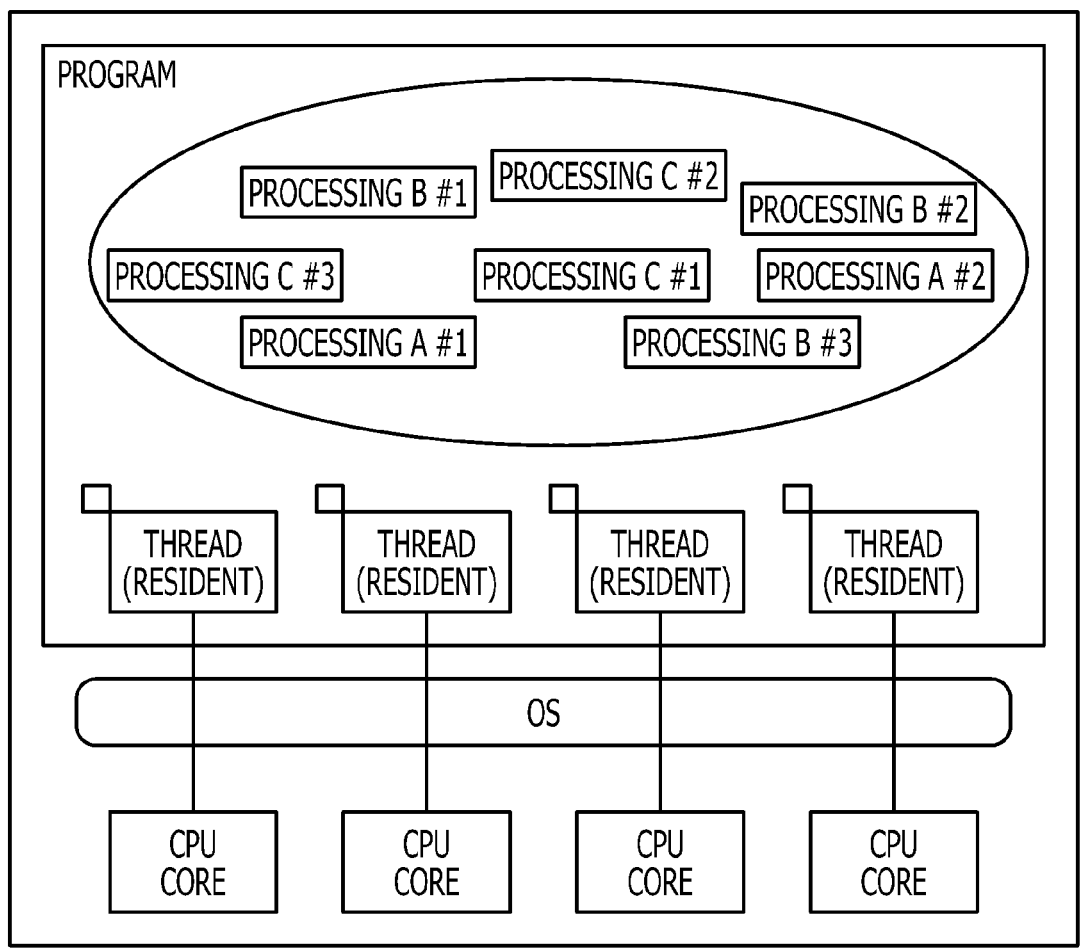
FIG. 1 is an explanatory diagram illustrating an example of a state in which threads executing program processing are concurrently executed in an information processing apparatus.

FIG. 1 is an explanatory diagram illustrating an example of a state where the threads executing the program processing are concurrently executed in the information processing apparatus. In the above-described example, a plurality of threads executing the program processing is concurrently executed on the OS operating by a Central Processing Unit (CPU). Processing A, processing B, and processing C are divided into a plurality of tasks, respectively. One of the tasks to which the processing A, the processing B, and the processing C are divided is enqueued to the task queue to be assigned to each thread. Each thread sequentially dequeues and executes the task that is assigned to the thread. The example illustrated in FIG. 1 has a configuration in which the information processing apparatus includes a plurality of CPU cores and the number of threads corresponds to the number of CPU cores. However, the present technique is not limited to this configuration.

In this manner, in the technique described in the embodiments of the present specification, the prescribed number of threads executing the program processing is concurrently executed. Thus, generation of thread switching and overhead of thread generation and discharging are suppressed. At this time, a serial program processing is divided into a plurality of tasks and enqueued by being assigned to any of the plurality of threads, and each of the threads dequeues and executes the enqueued task. Due to this, the processing load is prevented from being slanted to some of the threads that are concurrently executed, so that generation of differences in the delay time (processing waiting time) according to the program processing is suppressed. Therefore, a significant processing delay is prevented from being caused in part of the program processing. In this manner, according to the present technique, the processing efficiency at a time of the program processing by the information processing apparatus is improved while the generation of the thread switching and the overhead of the generation and discharging of the thread are suppressed.

2. First Embodiment

By using the example applied to the message relay device, a first embodiment will describe the technique explained in the above-described overview.

2.1 Whole System Configuration

Figure 2:
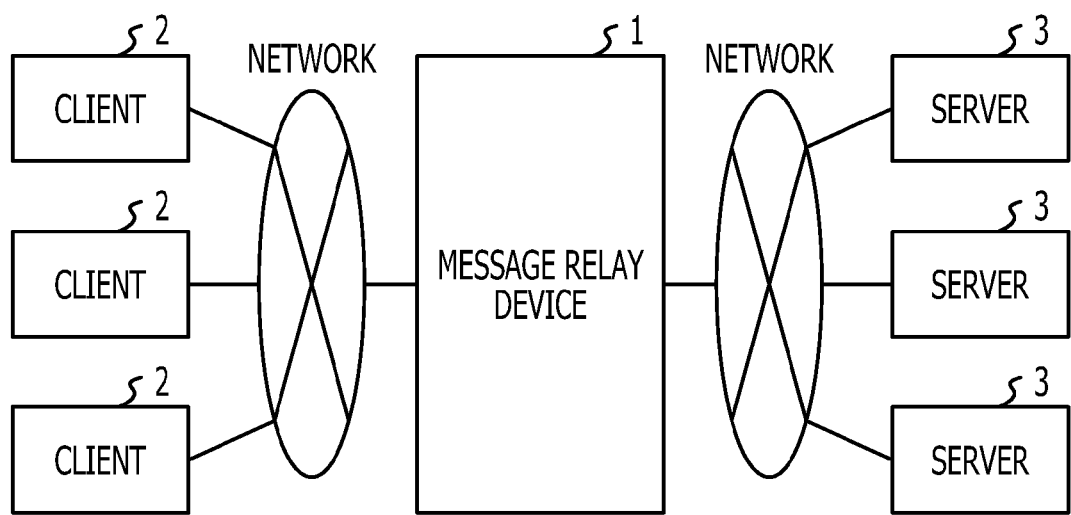
FIG. 2 is an explanatory diagram of an example of an entire system configuration having a message relay device.

FIG. 2 illustrates an entire system configuration having a message relay device according to the first embodiment. In the system, a message relay device 1 is coupled to a network to be able to communicate with a client 2 and a server 3. The network is, for example, a Local Area Network (LAN), a Wide Area Network (WAN), or the like. In the first embodiment, at least communication using a Transmission Control Protocol (TCP) is realized.

The sequence of data communication among the message relay device 1, the client 2, and the server 3 will be described below. (1) The client 2 transmits a request message for executing prescribed processing in the server 3 to the message relay device 1. (2) The message relay device 1 specifies the server 3 as a transfer destination of the message from the information included in the message received from the client 2 and transfers the request message to the specified server 3. (3) When receiving the request message from the message relay device 1, the server 3 executes the prescribed processing. The server 3 transmits a response message designated to the client 2 to the message relay device 1. (4) The message relay device 1 transfers the response message received from the server 3 to the client 2 as a transmission source of the request message.

2.2 Function Configuration of Message Relay Device

Figure 3:
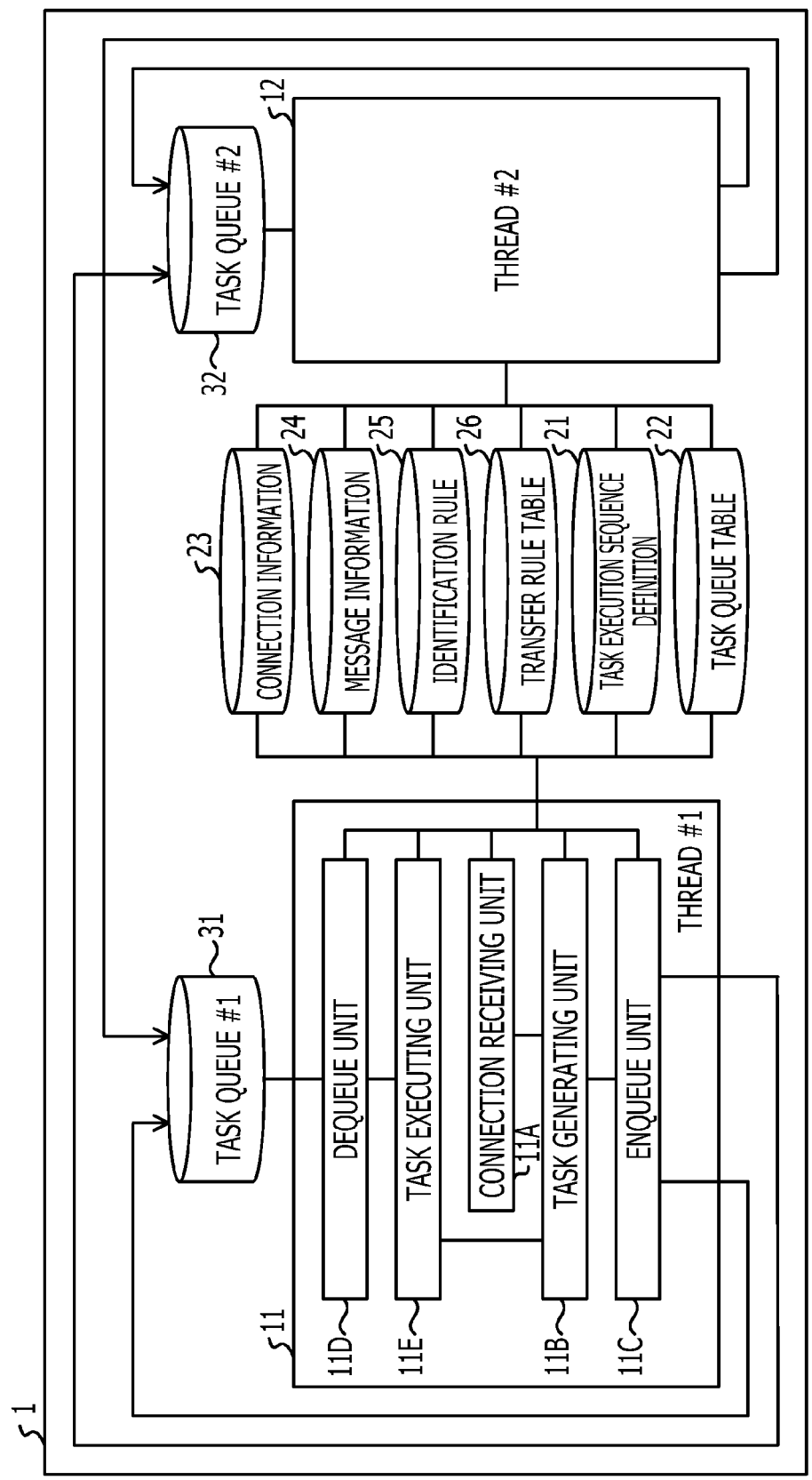
FIG. 3 is a function block diagram of an example of the message relay device.

FIG. 3 is a function block of an example of the message relay device 1. The message relay device 1 includes a thread 11 (thread #1) and a thread 12 (thread #2) that are executed by the CPU to execute the program processing. The thread 11 realizes a plurality of function units by being executed by the CPU and includes a connection receiving unit 11A, a task generating unit 11B, an enqueue unit 11C, a dequeue unit 11D, and a task executing unit 11E. Although the description is omitted, the thread 12 has the components equivalent to the thread 11. According to the first embodiment, the number of threads is two. However, the number of threads is variable. A storage unit included in the message relay device 1 stores a task execution sequence definition 21, a task queue table 22, a connection information 23, a message information 24, an identification rule 25, and a transfer rule table 26. The storage unit in the present specification indicates one or both of a volatile storage device such as a memory and a non-volatile storage device such as a storage.

Functions of the thread 11 (the thread 12 as well) will be described. The connection receiving unit 11A executes connection receiving processing in the communication of the message.

The task generating unit 11B generates one task among the plurality of tasks to which the serial program processing in response to one processing request is divided. Regarding the message relay device 1 according to the first embodiment, the serial program processing in response to one processing request represents relay processing of the message between the client 2 and the server 3 when one request message is received from the client 2. When the connection receiving unit 11A executes the connection receiving processing or when the task executing unit 11E ends the execution of one task, the task generating unit 11B generates a next task in the message relaying processing and gives the generated task to the enqueue unit 11C according to the task execution sequence definition 21.

The enqueue unit 11C enqueues the task generated by the task generating unit 11B to one of a task queue 31 of the thread 11 and a task queue 32 of the thread 12. At this time, the enqueue unit 11C investigates the queue length of the task queue of all the threads executed by the message relay device 1 and selects the task queue with the shortest queue length. The enqueue unit 11C enqueues the task to the selected task queue.

The dequeue unit 11D dequeues the task that is enqueued to the task queue 31 in association with the thread 11 and gives the dequeued task to the task executing unit 11E. The task executing unit 11E executes the dequeued task and gives the message information 24 and a sequence number of the received message to the task generating unit 11B.

Figure 4:
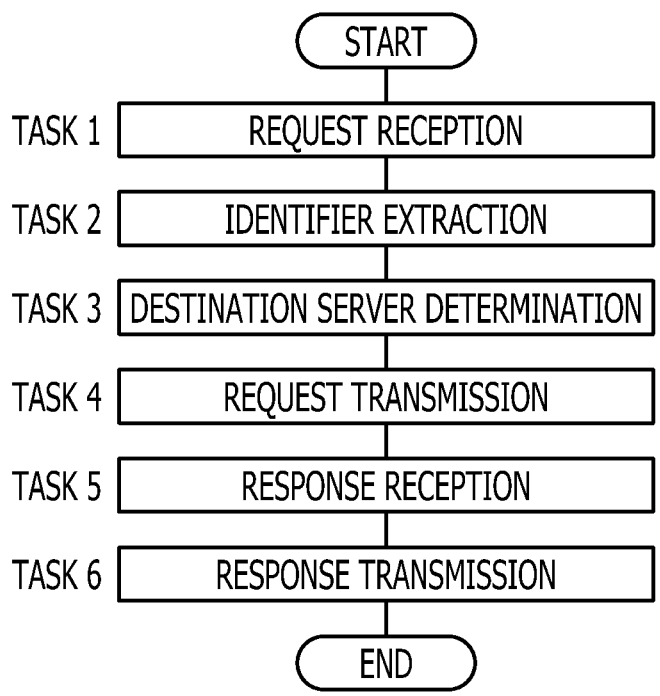
FIG. 4 is an explanatory diagram of an example of a task execution sequence definition.

Various types of data to be stored in the storage unit will be described. The task execution sequence definition 21 is data in which the task included in the program processing is defined with the sequence number of execution sequence. An example of the task execution sequence definition illustrated in FIG. 4 indicates an execution sequence of the task included in the message relay processing. A specific content of each task according to the first embodiment will be described.

The task queue 31 is a queue in which task data having information desired for execution of the task in the thread 11 is stored. The example of the task data illustrated in FIG. 5 indicates the task data that includes information desired for the execution of the task included in the message relay processing. The task data includes a function pointer, which indicates a function executing the processing of the task, and a pointer, which indicates an address of which the message information 24 as a processing target (argument) is stored on the memory. The task data further includes the sequence number indicating the currently executed task (in other words, the number specifying the sequence of the task and the number of the task to be executed next) from among the task execution sequence definition. The task queue 32 corresponding to the thread 12 stores the similar task data.

The task queue table 22 manages a state of the task queue in association with the all the threads executed by the message relay device 1. The example of the task queue table 22 illustrated in FIG. 6 includes a queue number, an associated thread, a read index, a write index, the largest element number, and each column of the leading address of a queue. The queue number uniquely specifies a task queue. The associated thread indicates a thread that processes the data stored in the task queue. The read index and the write index indicate an index at the reading position and an index at the current reading position in the task queue. The largest element number indicates the number of processing elements that may be stored in the task queue. The leading address of the task queue indicates the leading address of each task queue on the storage unit of the message relay device 1.

The connection information 23, which is generated when the connection receiving unit 11A establishes a connection, specifies the connection. The example of the connection information 23 illustrated in FIG. 7 includes an identifier that identifies a socket at a time of message reception, a transmission source IP address, a transmission source port, a destination IP address, and a destination port.

The message information 24, which is generated when the connection receiving unit 11A establishes a connection, relates to information desired for the message relay processing, the message body, and the like. The example of the message information 24 illustrated in FIG. 8A includes a data size of the message, a pointer of reception connection information, a pointer of transmission connection information, a leading address of the message data body, an identifier that identifies a socket, and an IP port and a port of the destination of the message. FIG. 8B indicates a specification example of the message data body. In the specification example, the message data includes a layer 7 protocol header (for example, a HyperText Transfer Protocol (HTTP) header), and message contents (for example, a Simple Object Access Protocol (SOAP) envelope).

The identification rule 25 is a block of data that specifies part where the identifier is described from among the message contents of the message data body. The example of the message information 24 illustrated in FIG. 9 includes an identifier extraction part and a format of an extraction position. The data example of the identification rule 25 illustrated in FIG. 9 corresponds to the example of the message data illustrated in FIG. 8B. That is, the identification rule 25 indicates that the identifier is described in Xpath format in <Presentity> of extensible Markup Language (XML) tag. In the message contents illustrated in FIG. 8B, the identifier is "sip: bob@example.com".

The transfer rule table 26 includes information that specifies the server 3 as the transfer destination of the message data. The example of the transfer rule table 26 illustrated in FIG. 10 includes an identifier and an IP address of a destination server of the transfer destination of the message data communicated by the socket that is specified by the identifier. For example, if the identifier is "sip:bob@example.com," the IP address of the destination server is "10.10.10.11:8080."

2.3 Hardware Configuration of Message Relay Device

Figure 11:
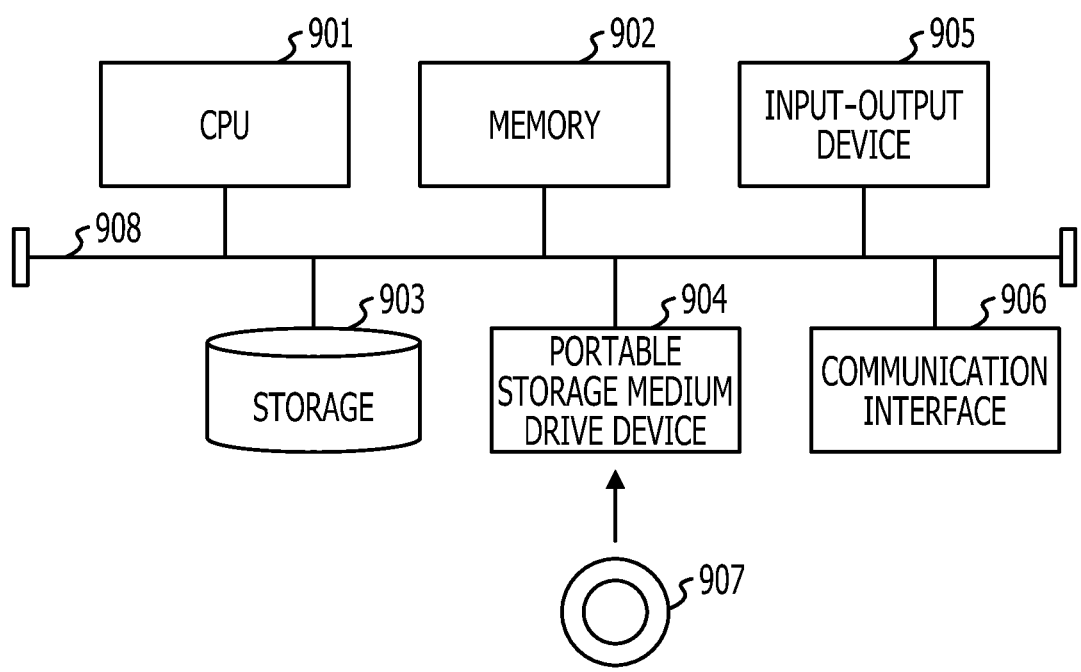
FIG. 11 is an explanatory diagram of an example of a hardware configuration of a message relay device.

FIG. 11 illustrates an example of a hardware configuration of an information processing apparatus in which the message relay device 1 is realized. The information processing apparatus includes a processor 901, a memory 902, a storage 903, a portable storage medium drive device 904, an input-output device 905, and a communication interface 906.

The processor 901 includes a control unit, a calculating unit, an order decoder, and the like, and the execution unit complies with the order of the program read by the order decoder and executes arithmetic and logical operation by using the calculating unit according to a control signal output from the control unit. The processor 901 includes a control register, which stores various information used for the control, a cache, which may temporally store the contents of the memory 2 or the like that is already accessed, and a TLB that has a function as the cache of a page table of a virtual storage. The CPU is an example of the processor 901. The processor 901 may have a configuration in which a plurality of CPU cores is provided.

The memory 902 is a storage device such as a Random Access Memory (RAM), for example. The program that is executed in the processor 901 is loaded into the memory 902. The memory 902 stores data used for the processing of the processor 901. The memory 902 in the information processing apparatus is used as a main memory. The storage 903 is a storage device such as a Hard Disk Drive (HDD) and a flash memory, for example. The storage 903 stores a program and various types of data. The portable storage medium drive device 904 reads out the data and the program stored in a portable storage medium 907. The portable storage medium 907 is, for example, a magnetic disk, an optical click, an optical magnetic disk, a flash memory, or the like. The processor 901 cooperates with the memory 902 and the storage 903 and executes the program stored in the storage 903 and the portable storage medium 907. The program that is executed by the processor 901 and the data as an access target may be stored in another device that is able to communicate with the information processing apparatus. The storage unit in the above-described message relay device 1 is at least one of the memory 902, the storage 903, and the portable storage medium 907.

The input-output device 905 is, for example, a keyboard, a display, or the like. The input-output device 905 receives an operation order made by a user operation or the like and outputs a processing result from the information processing apparatus. The communication interface 906 is, for example, a LAN card or the like. The communication interface 906 enables the data communication with an external unit. The components of the above-described information processing apparatus are coupled to each other with a bus 908.

According to the above-described embodiments, the data stored in the storage device may be included in the storage device included in another device other than the information processing apparatus. In this case, the information processing apparatus and the other device are coupled to a network to be able to communicate with each other, and the information processing apparatus accesses the storage device of the other device through the network.

2.4 Specific Example of Task Execution Sequence Definition

Regarding the example of the task execution sequence definition in the message relay processing, the specific contents of each task will be described below.

(Task 1) Request Reception

A request reception task receives a request message from the client 2 by the connection based on the reception connection information of the message information 24. The leading address and the data size of the received data are set to the message information 24.

(Task 2) Identifier Extraction

The identifier extraction task refers to the identification rule 25 to extract the identifier from the message data body. At this time, the identifier extraction task sets the extracted identifier to the message information 24.

(Task 3) Destination Determination

The destination determination task searches the transfer rule table 26 by the identifier of the message information 24 as a key to determine the server 3 as the destination of the message. At this time, the destination determination task sets the IP address and the port of the determined server 3 to the destination IP address and the port of the message information 24.

(Task 4) Request Transmission

The request transmission task establishes a connection with the server 3 based on the destination IP address and the port of the message information 24. At this time, the request transmission task generates and sets transmission connection information to the message information 24. The request transmission task uses the transmission connection to transmit the request message to the server 3.

(Task 5) Response Reception

The response reception task receives the response message from the server 3 by the connection based on the transmission connection information of the message information 24. At this time, since the message information 24 other than the reception connection information is temporally released, the response reception task sets the leading address and the data size of the received data to the message information 24.

(Task 6) Response Transmission

Based on the reception connection information of the message information 24, the response transmission task transmits the response message received from the server 3 to the client 2 by using the connection.

2.5 Processing Executed in Message Relay Device

The processing executed in the message relay device according to the first embodiment will be described.

Figure 12:
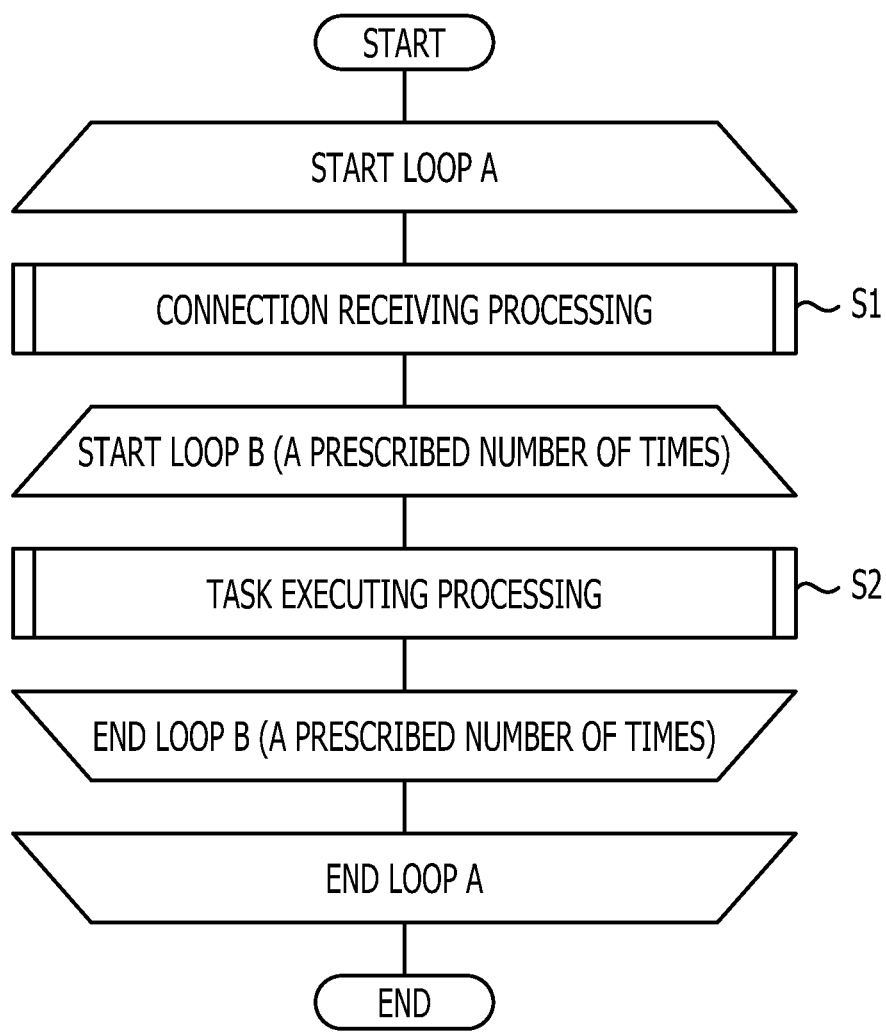
FIG. 12 is a flowchart illustrating an example of a flow of whole processing executed by each thread.

FIG. 12 is a flowchart illustrating an example of a flow of the whole processing that is executed by each thread. Operation S1 and Operation S2 are repeatedly executed every prescribed time of period (Loop A). In Operation S1, the connection receiving unit 11A, the task generating unit 11B, and the enqueue unit 11C execute the connection receiving processing. Operation S2 is repeatedly executed a prescribed number of times (Loop B).

In Operation S2, the dequeue unit 11D, the task executing unit 11E, the task generating unit 11B, and the enqueue unit 11C execute the task executing processing.

Figure 13:
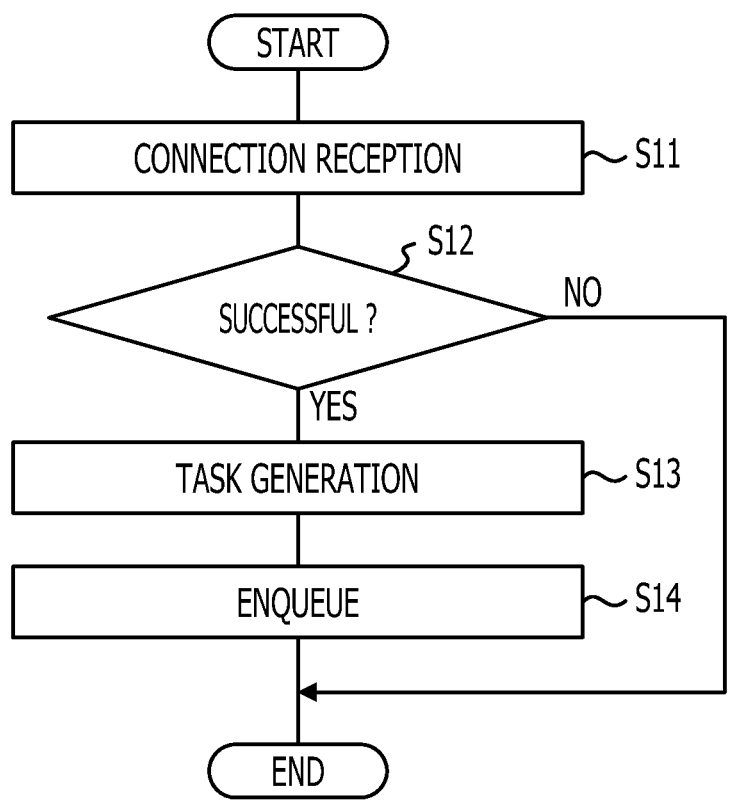
FIG. 13 is a flowchart illustrating an example of connection receiving processing.

FIG. 13 illustrates the connection receiving processing that is executed by the connection receiving unit 11A, the task generating unit 11B, and the enqueue unit 11C. In Operation S11, the connection receiving unit 11A receives a TCP connection.

In Operation S12, the connection receiving unit 11A determines whether the reception of the TCP connection is successful. If the reception of the TCP connection is successful (Yes), the process goes to Operation S13. At this time, the connection receiving unit 11A generates the connection information 23 and the message information 24 and gives the message information 24 to the task generating unit 11B. On the other hand, if the reception of the TCP connection is not successful, the process ends.

In Operation S13, when receiving the message information 24 from the connection receiving unit 11A, the task generating unit 11B refers to the task execution sequence definition 21 to generate a leading task (the task of which the sequence number is 1). The task generating unit 11B transmits the generated task to the enqueue unit 11C. Specifically, the task generating unit 11B generates task data and gives the generated task data to the enqueue unit 11C.

In Operation S14, the enqueue unit 11C refers to the task queue table 22 to investigate the queue length of each task queue corresponding to all the threads. The enqueue unit 11C selects the task queue with the shortest queue length to enqueue the task generated by the task generating unit 11B to the selected task queue.

For example, when the state of each task queue indicates the data example of the task queue table 22 illustrated in FIG. 6, the enqueue processing will be described below. That is, the enqueue unit 11C investigates the difference between the read index and the write index regarding the task queue 31 (#1) and the task queue 32 (#2) that are able to enqueue up to 1000 tasks. Since the difference is 0 regarding the task queue 31, the queue length is 0. Since the difference is 252 regarding the task queue 32, the queue length is 252. Therefore, the enqueue unit 11C enqueues the task to the task queue 31. The enqueue unit 11C stores the task data in the address ahead of the write index from the leading address of the task queue 31 and increases the write index by one. If the write index is equal to the largest element number 1000 after the write index is increased by one, the enqueue unit 11C sets 0 to the write index.

Figure 14:
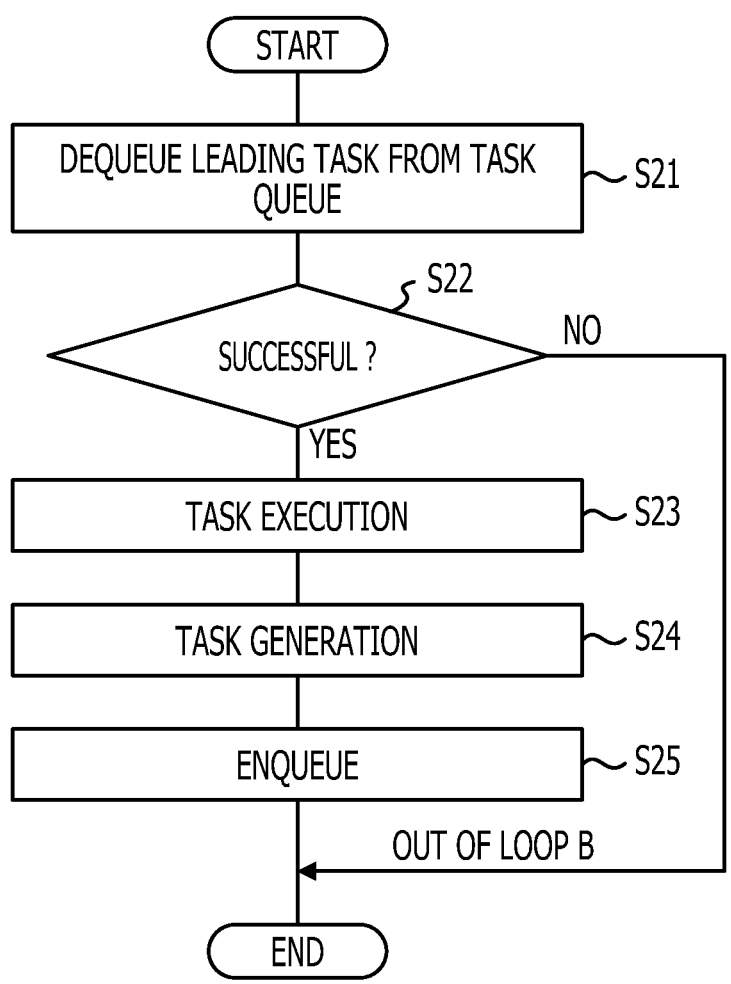
FIG. 14 is a flowchart illustrating an example of task executing processing.

FIG. 14 illustrates the task executing processing that is executed by the dequeue unit 11D, the task executing unit 11E, the task generating unit 11B, and the enqueue unit 11C.

In Operation S21, the dequeue unit 11D dequeues the task stored in the task queue 31. Specifically, the dequeue unit 11D refers to the task queue table 22 to investigate the queue length of the task queue 31 associated with the thread. At this time, if the queue length of the task queue is larger than 0, the dequeue is successful. On the other hand, if the queue length of the task queue is 0, the dequeue is not successful. The dequeue unit 11D dequeues the task related to the task data ahead of the read index from the leading address of the queue. If the dequeue is successful, the dequeue unit 11D clears the area in which the obtained task data is registered and transmits the task to the task executing unit 11E while increasing the read index of the task queue table 22 by one. If the read index is equal to the largest element number after the read index is increased by one, the dequeue unit 11D sets 0 to the read index.

In Operation 22, the dequeue unit 11D determines whether the dequeue is successful in Operation S21. If the dequeue is successful (Yes), the process goes to Operation S23. If the dequeue is not successful (No), the process ends with the unsuccessful dequeue. In this case, the end of the process means that the process gets out of Loop B in the whole processing illustrated in FIG. 12.

In Operation S23, the task executing unit 11E executes the task that is dequeued by the dequeue unit 11D. That is, the task executing unit 11E executes the function, which is specified by the function pointer, with the pointer of the message information 24 included in the task data as an argument. For example, if the dequeued task is related to the task data illustrated in FIG. 5, the task executing unit 11E executes the function pointer of the request reception function with the pointer of the message information 24 as an argument. When ending the execution of the task, the task executing unit 11E increases the sequence number of the task data by one and gives the sequence number and the message information 24 to the task generating unit 11B.

In Operation S24, based on the sequence number given by the task executing unit 11E, the task generating unit 11B generates the task of the processing with the sequence number. The task generating unit 11B gives the generated task to the enqueue unit 11C.

In Operation S25, the enqueue unit 11C refers to the task queue table 22 to investigate the queue length of each task queue corresponding to all the threads. The enqueue unit 11C selects the task queue with the shortest queue length to enqueue the task generated by the task generating unit 11B to the selected task queue.

2.6 Effect, Deformation, and the Like According to First Embodiment

According to the first embodiment, since a prescribed number of the threads are concurrently executed, the thread switching and the overhead of the generating processing and the discharging processing of the threads are reduced. Based on the task execution sequence definition, one program processing is divided into a plurality of tasks to be enqueued to the task queue of each thread, and each of the threads dequeues and executes each of the enqueued tasks. Due to this, the processing load is prevented from being slanted to some of the threads that are concurrently executed, so that generation of differences in the delay time according to the program processing is suppressed. Therefore, a specially big processing delay is prevented from being generated in part of the program processing. In this manner, according to the technique described in the first embodiment, the processing efficiency of the program processing may be improved while the generation of thread switching and the overhead of the generating processing and the discharging processing of the threads are suppressed.

If the task queue of the enqueue destination is the queue with the shortest queue length, the processing load of each thread is further adjusted, so that the CPU is used more efficiently.

The number of threads may match the number of CPU cores included in the message relay device 1. As a result, the processing cost for switching the threads in the CPU is further reduced.

The connection receiving processing in the message relay device 1 is not executed in all the threads. For example, some specific threads typically may execute the connection receiving processing.

3. Second Embodiment 3.1 Overview of Second Embodiment

The message relay device according to a second embodiment executes the tying of the tasks with the similar function as well as the processing in the message relay device according to the first embodiment and then sequentially execute the tasks with the similar function. In general, the tasks with the similar function refer to the similar data in most cases. In a specific example of the task of the message relay processing, for example, a destination determination task refers to the same transfer rule table when being executed by any of the threads. In this manner, since the tasks with the similar function are sequentially executed, a hit rate of the cache in the CPU is improved. As a result, the processing efficiency is further improved. In the explanation of the second embodiment, the description of the parts equivalent to the first embodiment is omitted.

Figure 15:
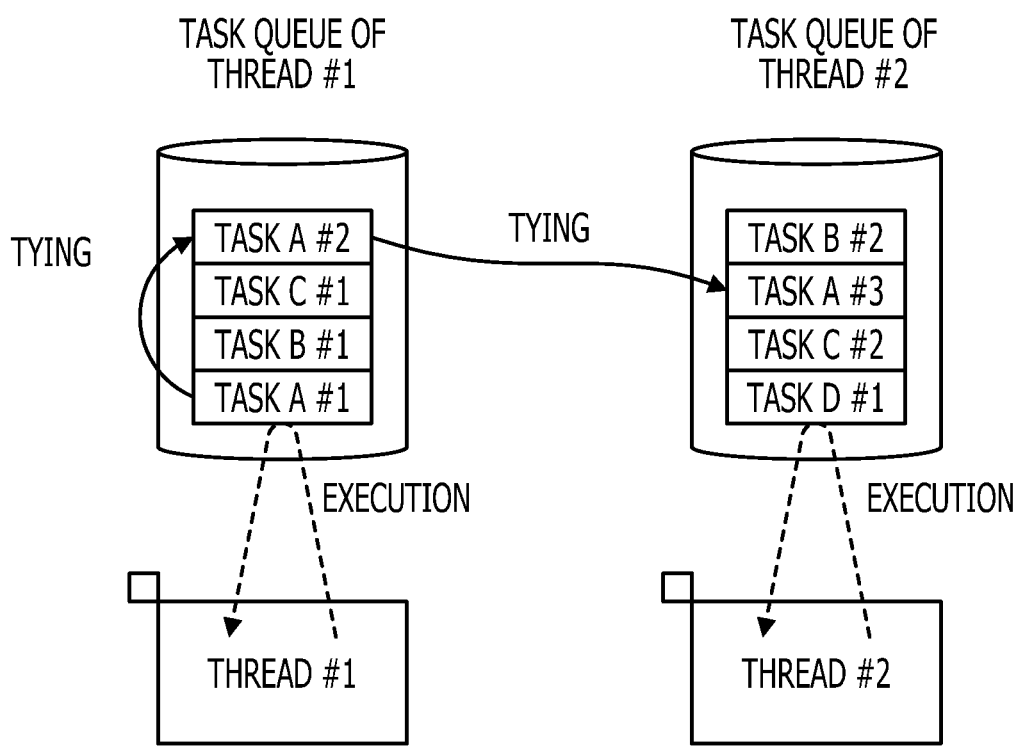
FIG. 15 is an explanatory diagram illustrating a specific example of processing according to a second embodiment.

A specific example of the processing achieved in the second embodiment will be described with reference to FIG. 15. For example, the task queues of the thread #1 and the thread #2 are in the state illustrated in FIG. 15, respectively. Specifically, the task data of the tasks A#1, B#1, C#1, and A#2 exists in the task queue of the thread 1. The task data of the tasks D#1, C#2, A#3, and B#2 exists in the task queue of the thread 2. Each of the tasks A, B, C, and D indicates a group of the tasks with the similar function. Specifically, the group of the task includes each task in the task execution sequence definition (for example, request reception, identifier extraction, and the like in the example illustrated in FIG. 4). At this time, according to the second embodiment, the tasks with the similar function are tied. For example, regarding the task A, the tasks A#1, A#2, and A#3 are tied. At this time, for example, the tasks are tied in order of the task A#1, the task #2, and the task #3.

In this case, according to the second embodiment, after executing the task A#1, the thread #1 executes the task A#2 tied with the task A#1 instead of the task B#1 stored in the task queue. After executing the task A#2, the thread #1 executes the task A#3 of the task queue of the thread #2 tied with the task A#2. In this manner, according to the second embodiment, when the tasks are tied, the tasks with the similar function are sequentially executed. According to the second embodiment, when the tasks are not tied, the tasks stored in the task queue are sequentially executed as usual. For example, in the example illustrated in FIG. 15, the thread #2 sequentially executes the tasks from the task D#1. At this time, for example, if the task A#3 is already executed by the thread #1, the thread #2 executes the task B#2 following the task C#2.

3.2 Function Configuration of Message Relay Device

Figure 16:
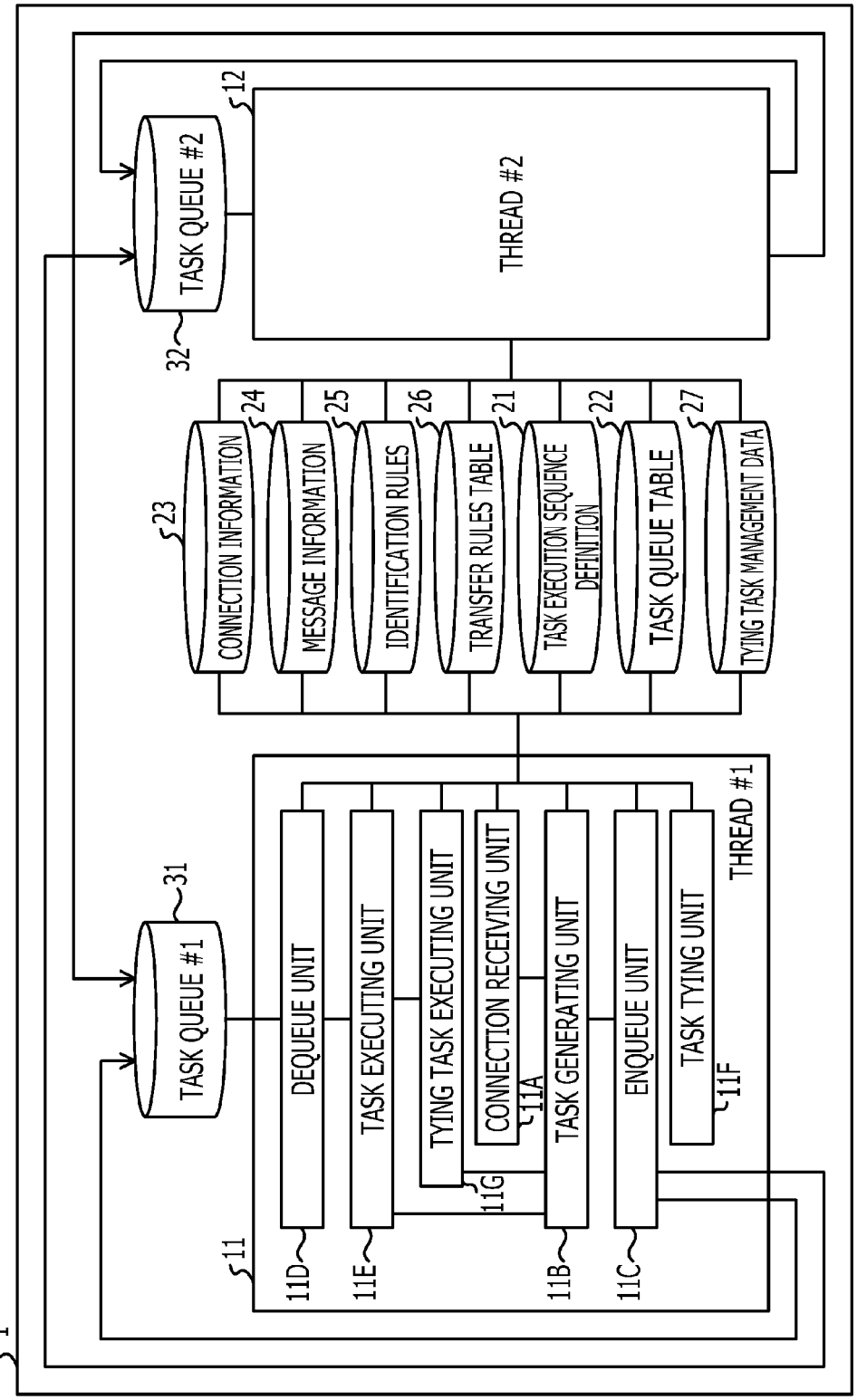
FIG. 16 is a function block diagram of an example of the message relay device.

FIG. 16 is a function block diagram of an example of the message relay device according to the second embodiment. In the message relay device according to the second embodiment, the thread includes a task tying unit 11F and a tying task executing unit 11G as well as the components of the message relay device according to the first embodiment. The message relay device 1 according to the second embodiment further includes a tying task management data 27 in the storage unit. The task queue includes the task management data that wraps the task data.

The task tying unit 11F ties the tasks with the similar function. The tying task executing unit 11G sequentially executes the tasks with the similar function by following the tied tasks.

The tying task management data 27 manages the tasks to indicate what tasks stored in the task queue are tied for each of the tasks with the similar function. The example of the tying task management data illustrated in FIG. 17 includes the function of the tying target task as the similar function (that is, for the task that is defined by the task execution sequence definition), the tied final task, and the final position in the task queue of the investigated task. The tied final task includes an address on the memory of the task and information indicating which thread to which the task belongs. An investigated task is a task that is investigated to know whether the task may be tied. The final position inside the task queue of the investigated task is held in each of the task queues.

Figure 18:
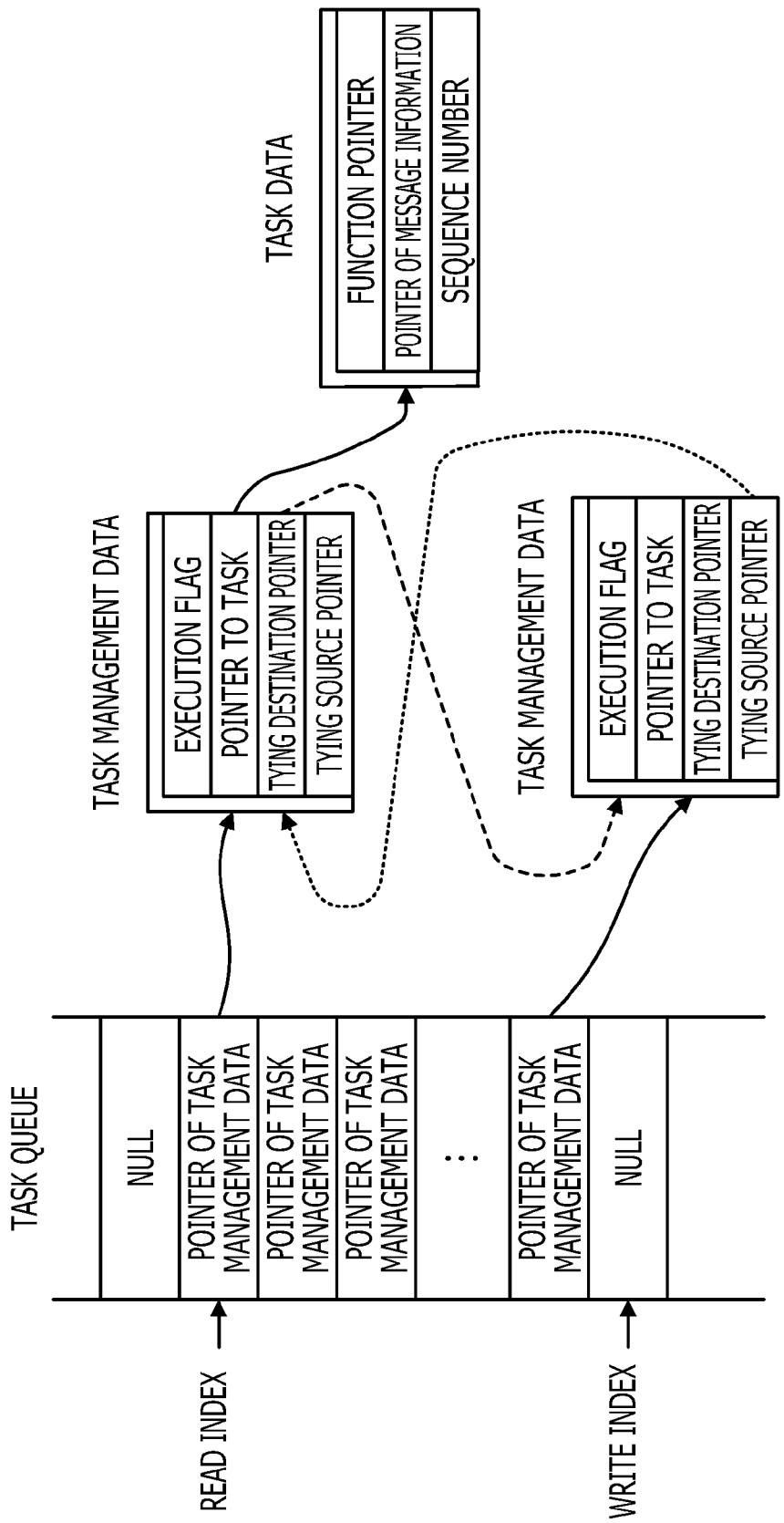
FIG. 18 is an explanatory diagram illustrating an example of a relation among a task queue, task management data, and task data.

FIG. 18 is an explanatory diagram illustrating a relation among the task queue, the task management data, and the task data. The task queue stores the task data that is wrapped by the task management data. Specifically, the task queue stores the pointer to the task management data. The task management data includes an execution flag indicating whether the task is able to be executed, a pointer to the task data, a tying destination pointer, and a tying source pointer. The tying destination pointer is a pointer to the task management data of the task that is executed following the task. The tying source pointer is a pointer to the task management data of the task that is executed before the task. The configuration of the task data is equivalent to the configuration illustrated in FIG. 5, so that description thereof is omitted.

3.3 Processing Executed by Message Relay Device

The processing executed by the message relay device 1 according to the second embodiment will be described below.

Figure 19:
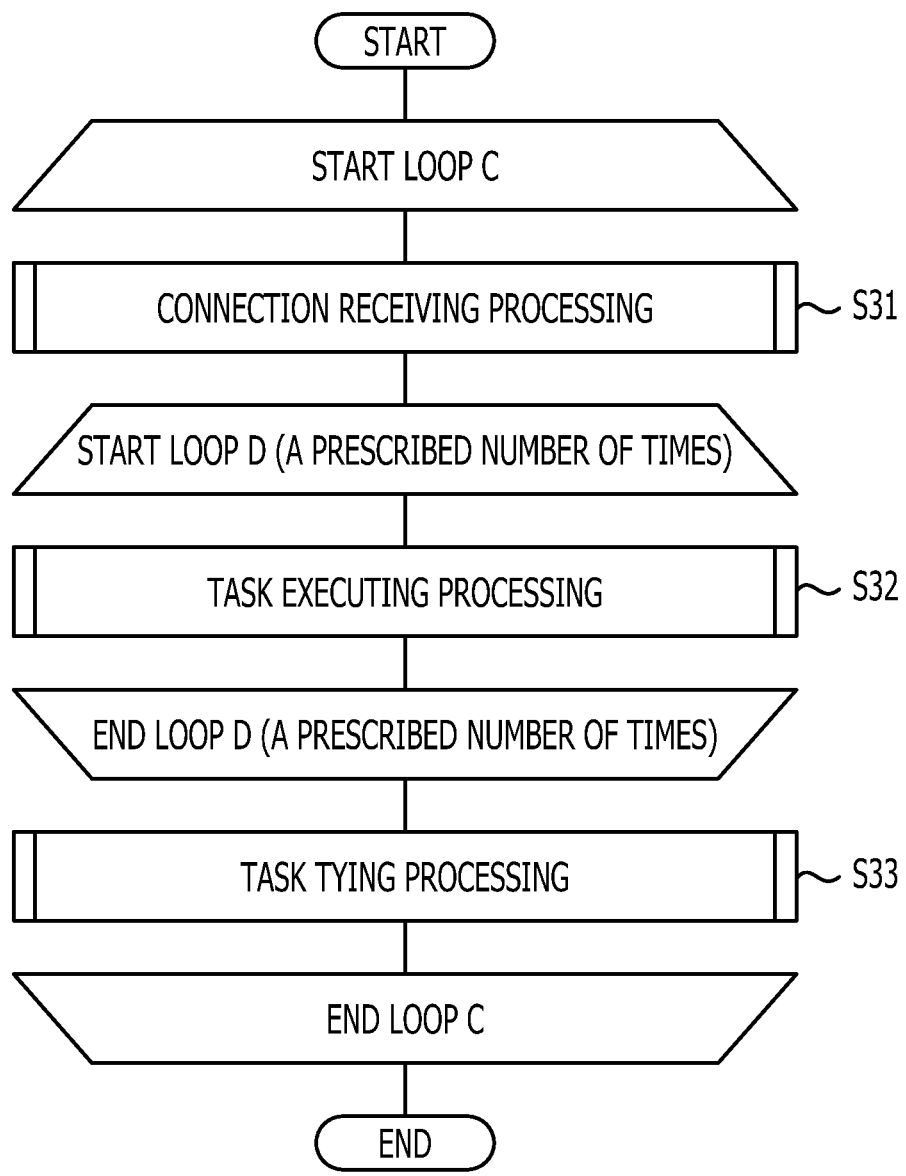
FIG. 19 is a flowchart illustrating an example of the flow of the whole processing executed by each thread.

FIG. 19 is a flowchart illustrating an example of the flow of the whole processing executed by each thread. Operations S31, S32, and S33 are repeatedly executed every prescribed period of time (Loop C). In Operation S31, the connection receiving unit 11A, the task generating unit 11B, and the enqueue unit 11C execute the connection receiving processing. Operation S32 is repeatedly executed a prescribed number of times (Loop D).

In Operation S32, the dequeue unit 11D, the task executing unit 11E, the task generating unit 11B, the enqueue unit 11C, and the tying task executing unit 11G execute the task executing processing. In Operation S33, the task tying unit 11F executes the task tying processing.

Figure 20:
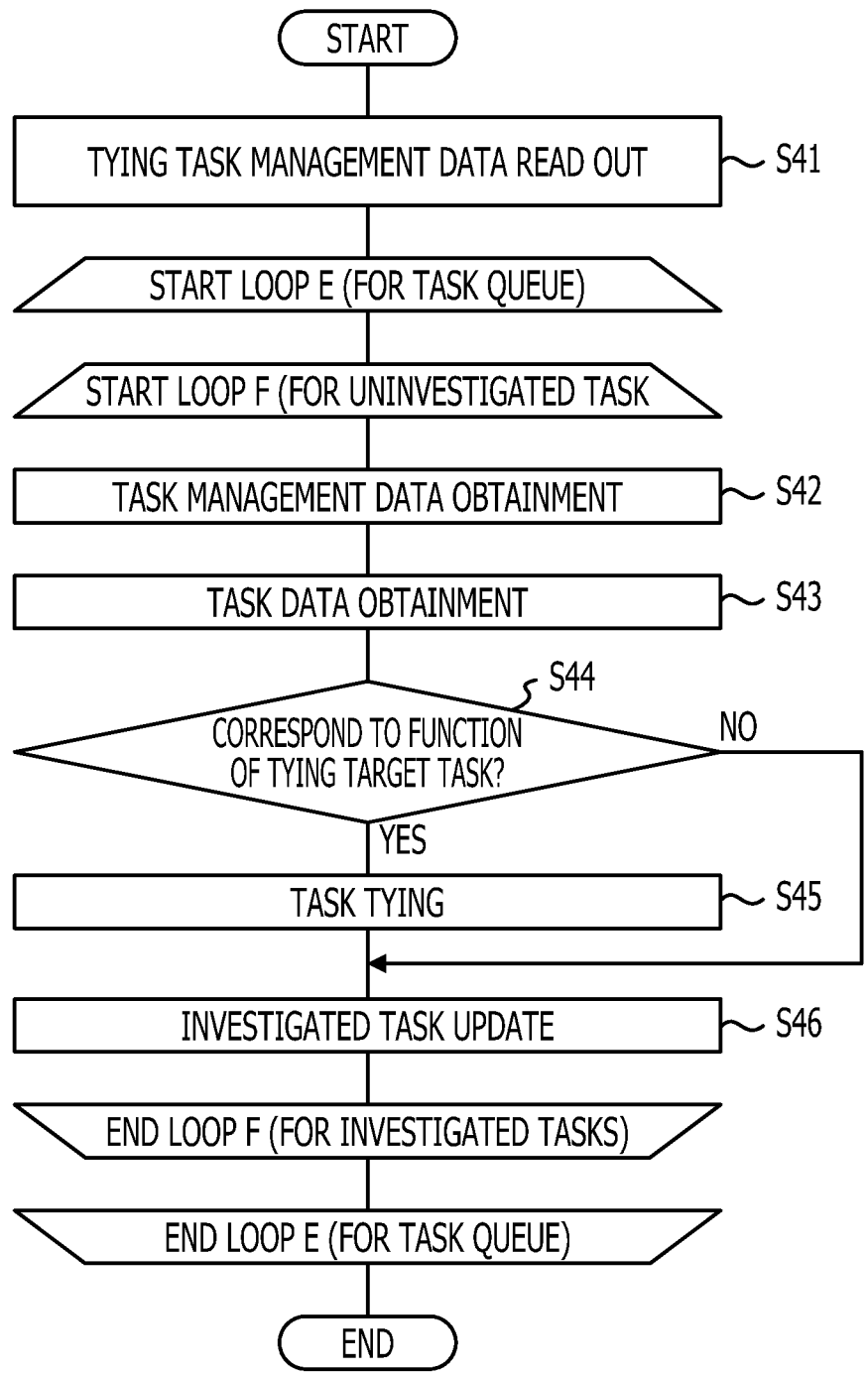
FIG. 20 is a flowchart illustrating an example of task tying processing.

FIG. 20 illustrates the task tying processing that is executed by the task tying unit 11F. In Operation S41, the task tying unit 11F reads out, from the tying task management data 27, the function of the task as the tying target, the tied final task, and the final position inside the task queue of the investigated task.

Operations S42 to S45 are executed for the respective task queues, respectively (Loop E) and are repeatedly executed typically for the number of uninvestigated tasks of the respective task queues (Loop F). In Operation S42, the task tying unit 11F obtains the task management data, which is positioned next to the final position in the queue of the investigated task, of the task queue that is being currently investigated.

In Operation S43, the task tying unit 11F obtains the task data from the obtained task management data. In Operation S44, the task tying unit 11F compares the address of the function of the tying target task of the tying task management data 27 to the address of the function pointer included in the obtained task data. If both the addresses correspond to each other (Yes), the process goes to Operation S45. If both the addresses do not correspond to each other (No), the process goes to Operation S46.

In Operation S45, the task tying unit 11F ties the obtained task management data to the task management data of the tied final task. Specifically, the task tying unit 11F sets the address of the task management data to the tying destination pointer of the task management data of the tied final task of the tying task management data 27. The task tying unit 11F sets the address of the task management data of the tied final task of the tying task management data 27 to the tying source pointer of the obtained task management data. In this manner, a bidirectional link is formed. After completing the task tying, the task tying unit 11F sets the task queue, to which the task of the obtained task management data is enqueued, and the set address thereof to the tied final task of the tying task management data 27.

In Operation S45, the task tying unit 11F updates the investigated task of the tying task management data 27 by the index of the task management data obtained in Operation S42. The connection receiving processing is equivalent to the first embodiment, so that description thereof is omitted.

Figure 21:
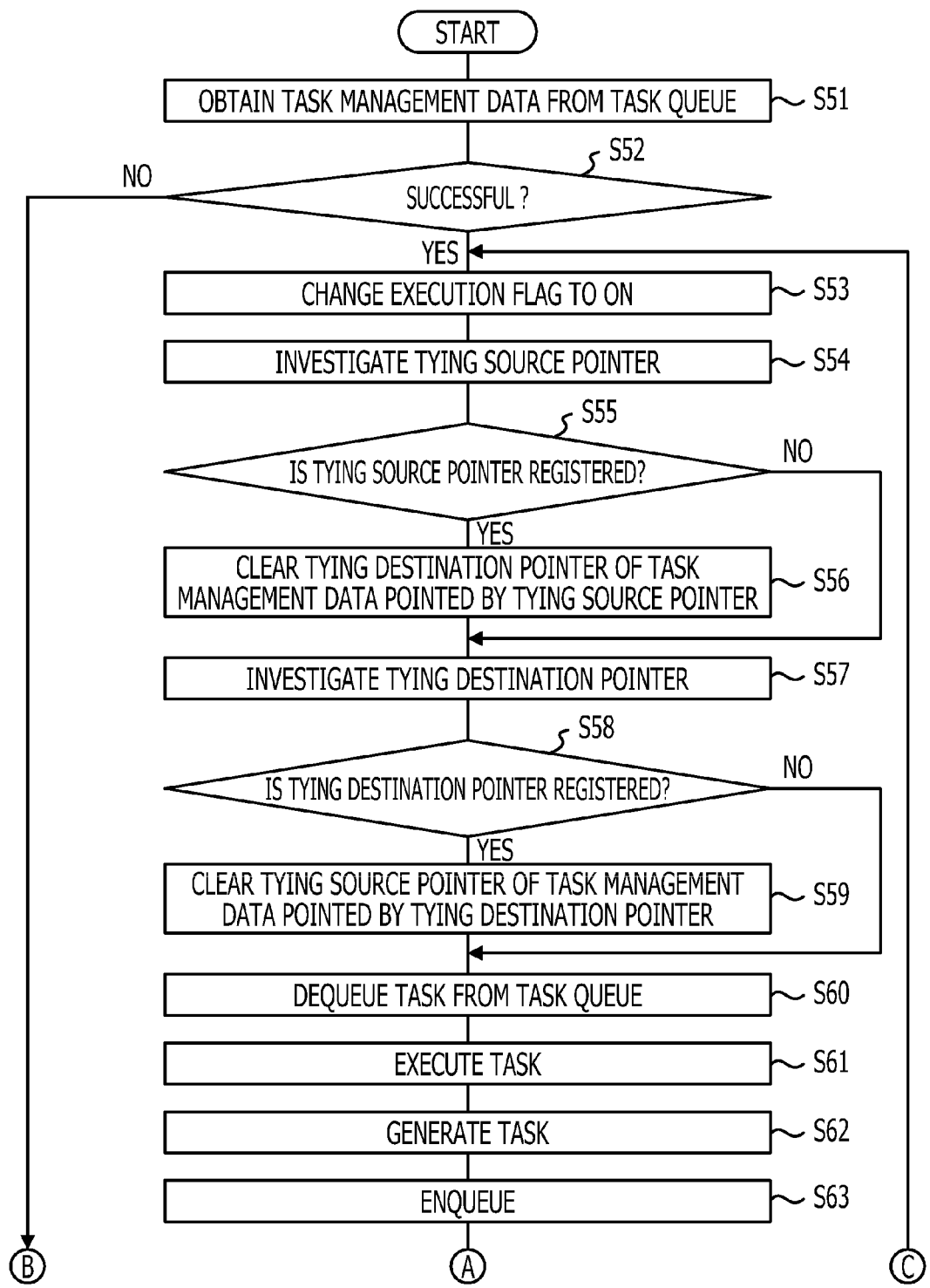
FIG. 21 is a flowchart illustrating an example of the task executing processing.
Figure 22:
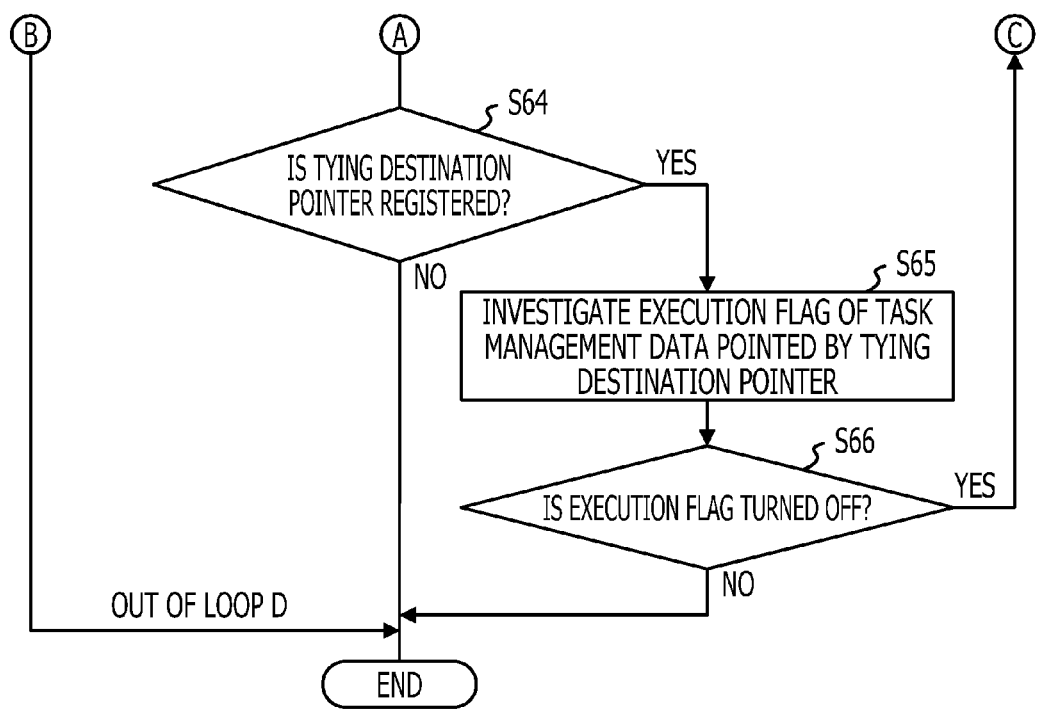
FIG. 22 is a flowchart illustrating an example of the task executing processing.

FIGS. 21 and 22 illustrate the task executing processing that is executed by the dequeue unit 11D, the task executing unit 11E, the task generating unit 11B, the enqueue unit 11C, and the tying task executing unit 11G. In Operation S51, the dequeue unit 11D obtains the task management data stored in the task queue 31. Specifically, the dequeue unit 11D refers to the task queue table 22 to investigate the queue length of the task queue 31 associated with the thread. At this time, when the queue length of the task queue is larger than 0 and the execution flag of the obtained task management data is turned OFF, the obtainment of the task management data is successful. On the other hand, when the queue length of the task queue is 0, the obtainment of the task management data is not successful. Even when the queue length of the task queue is larger than 0, the dequeue unit 11D skips the task management data and investigates the task management data of the next index if the execution flag is turned ON.

In Operation S52, the dequeue unit 11D determines whether the obtainment of the task management data in Operation S51 is successful. If the obtainment of the task management data is successful (Yes), the process goes to Operation 53.

If the obtainment of the task management data is not successful (No), the process ends. In this case, the end of the process means that the process gets out of Loop D in the whole processing illustrated in FIG. 19.

In Operation S53, the dequeue unit 11D turns ON the execution flag of the obtained task management data. In Operation S54, the dequeue unit 11D investigates the tying source pointer of the obtained task management data.

In Operation S55, the dequeue 11D determines whether the address is registered in the tying source pointer. If the address is registered in the tying source pointer (Yes), the process goes to Operation S56. If the address is not registered in the tying source pointer (No), the process goes to Operation S57.

In Operation S56, the dequeue unit 11D clears the tying destination pointer of the task management data of the address pointed by the tying source pointer. In Operation S57, the dequeue unit 11D investigates the tying destination pointer of the obtained task management data.

In Operation S58, the dequeue unit 11D determines whether the address is registered in the tying destination pointer. If the address is registered in the tying destination pointer (Yes), the process goes to Operation S59. If the address is not registered in the tying destination pointer (No), the process goes to Operation S60.

In Operation S59, the dequeue unit 11D clears the tying source pointer of the task management data of the address pointed by the tying destination pointer of the obtained task management data. In Operation S60, the dequeue unit 11D dequeues the task related to the task data of the obtained task management data. If the dequeue is successful, the dequeue unit 11D clears the area in which the obtained task management data is registered and transmits the task to the task executing unit 11E while increasing the read index. If the read index is equal to the largest element number after increasing the read index, the dequeue unit 11D sets 0 to the read index.

In Operation S61, the task executing unit 11E executes the task that is dequeued by the dequeue unit 11D. That is, the task executing unit 11E executes the function, which is specified by the function pointer with the pointer of the message information 24, included in the task data as an argument. After executing the task, the task executing unit 11E increases the sequence number of the task data by one and gives the sequence number, the message information 24, and the task management data corresponding to the task data to the task generating unit 11B.

In Operation 62, the task generating unit 11B generates a task based on the sequence number given from the task executing unit 11E. Specifically, the task generating unit 11B generates a block of task data to which the address of the function processing the task with the sequence number is set and generates a block of task management data corresponding to the task data. The task generating unit 11B gives the generated task management data and the task management data given from the task executing unit 11E to the enqueue unit 11C.

In Operation S63, the enqueue unit 11C refers to the task queue table 22 to investigate the queue length of all the threads. The enqueue unit 11C selects the task queue with the shortest queue length and executes the enqueue of the task generated by the task generating unit 11B on the selected task queue.

In Operation S64, the enqueue unit 11C investigates the task management data given from the task executing unit 11E to determine whether the tying destination pointer is registered in the task management data in which the executed task is registered. If the tying destination pointer is registered in the task management data (Yes), the enqueue unit 11C gives the task management data pointed by the tying destination pointer to the tying task executing unit 11G. The process goes to Operation S65. If the tying destination pointer is not registered in the task management data (No), the process ends (that is, the process goes back to Operation S51 in Loop D, and the processing of the task management data with the next queue sequence is executed.).

In Operation S65, the tying task executing unit 11G investigates the execution flag of the task management data given from the enqueue unit 11C. In Operation S66, the tying task executing unit 11G determines whether the execution flag is turned OFF. If the execution flag is turned OFF (Yes), the tying task executing unit 11G executes the processing of Operations S53 to S66 regarding the task management data obtained from the enqueue unit 11C. If the execution flag is turned ON (No), the process ends (that is, the process goes back to Operation S51 in Loop D, and the processing of the task management data with the next queue sequence is executed.).

3.4 Effect and Deformation Example According to Second Embodiment

According to the second embodiment, if the tying processing of the tasks with the similar function is sequentially executed in addition to the first embodiment, the processing for referring to the similar data is sequentially executed. As a result, the hit rate of cache in the CPU is increased, and the processing efficiency is improved.

For example, as a method for sequentially executing the tasks with the similar function, there is a method for enqueuing the tasks with the similar function to a single task queue and sequentially executing the tasks. However, the above-described method has a problem that the processing amount of each thread is unbalanced, so that the CPU may not be effectively used eventually.

On the contrary, according to the second embodiment, the enqueue is executed in such a way that the queue lengths corresponding to the respective threads are even, and the sequential execution of the tied task is dispersively executed. Therefore, there is an advantage that the processing amount of each thread is balanced.

Figure 23A:
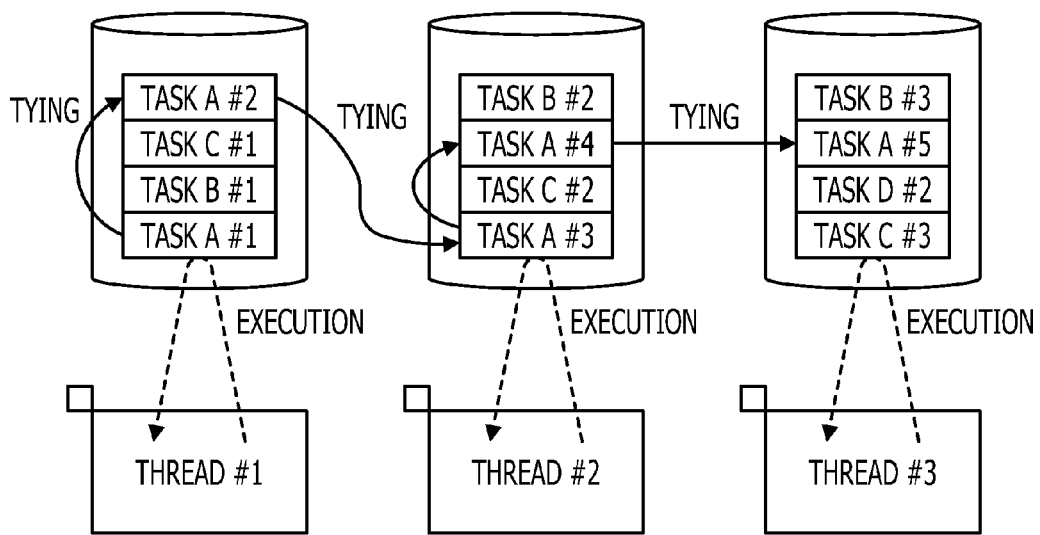
FIGS. 23A and 23B are an explanatory diagram illustrating a specific example of the processing according to the second embodiment.
Figure 23B:
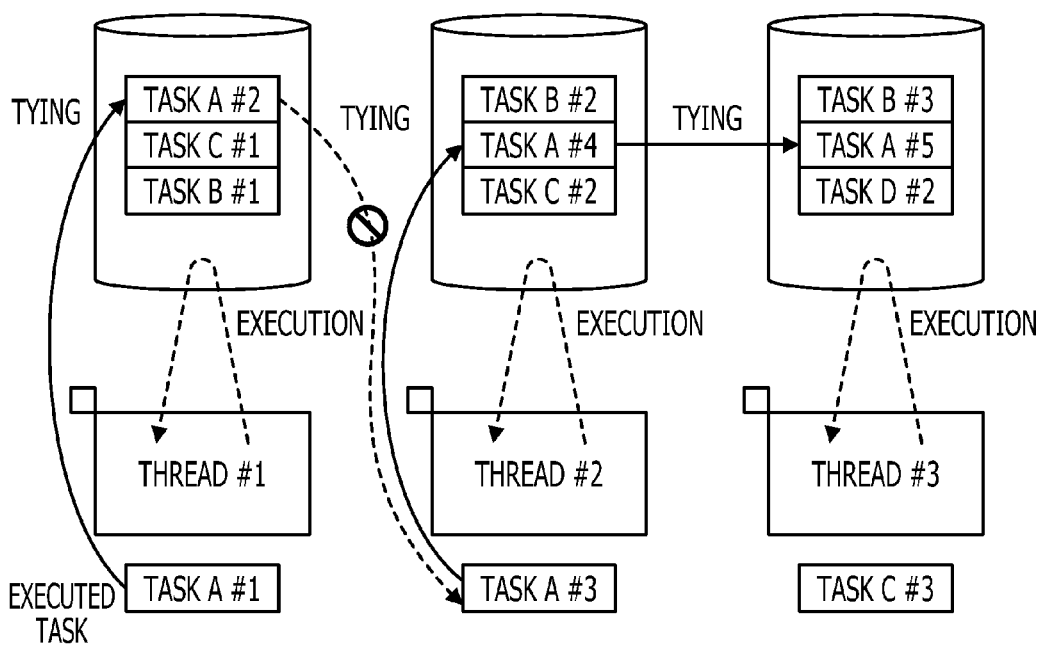

For example, as illustrated in FIGS. 23A and 23B, the threads #1, #2, and #3 are assumed to be executed. In the first stage illustrated in FIG. 23A, the task data of the tasks A#1, B#1, C#1, and A#2 exists in the task queue of the thread 1. Further, the task data of the tasks A#3, C#2, A#4, and B#2 exists in the task queue of the thread 2. Furthermore, the task data of the tasks C#3, D#2, A#5, and B#3 exists in the task queue of the thread 3. At this time, the tasks A#1, A#2, A#3, A#4, and A#5 are tied. When the task A#3 is in the execution sequence of the queue, the thread 2 executes the task A#3 regardless of the tying. After the task A#3 is executed, the tying from the task A#2 to the task A#3 is invalid in the second stage illustrated in FIG. 23B. On the other hand, the thread 2 executes the task A#4 of the task queue of the thread 3 after executing the task A#3. That is, when the execution sequence of the task comes, each thread executes the task no matter whether the task is tied to another task. Therefore, even if the number of the tied tasks is large, the processing amount of a specific thread is not drastically increased. Even if part of the tying is invalid after the thread executes the task according to the execution sequence of the task queue, the thread that executed the task is assumed to sequentially execute the tasks by further following the tying if another task is tied to the executed task. Therefore, according to the second embodiment, the sequential execution of the tasks with the similar function is realized while the processing amount of a specific thread is prevented from increasing to be notably unbalanced.

4. Third Embodiment

4.1 Overview of Third Embodiment

The message relay device according to a third embodiment executes the tying processing of the tasks with the similar function in the message relay device according to the second embodiment is executed at a time of the enqueue of each task. As for the third embodiment, the description of the parts equivalent to the first embodiment and the second embodiment is omitted.

4.2 Function Configuration of Message Relay Device

Figure 24:
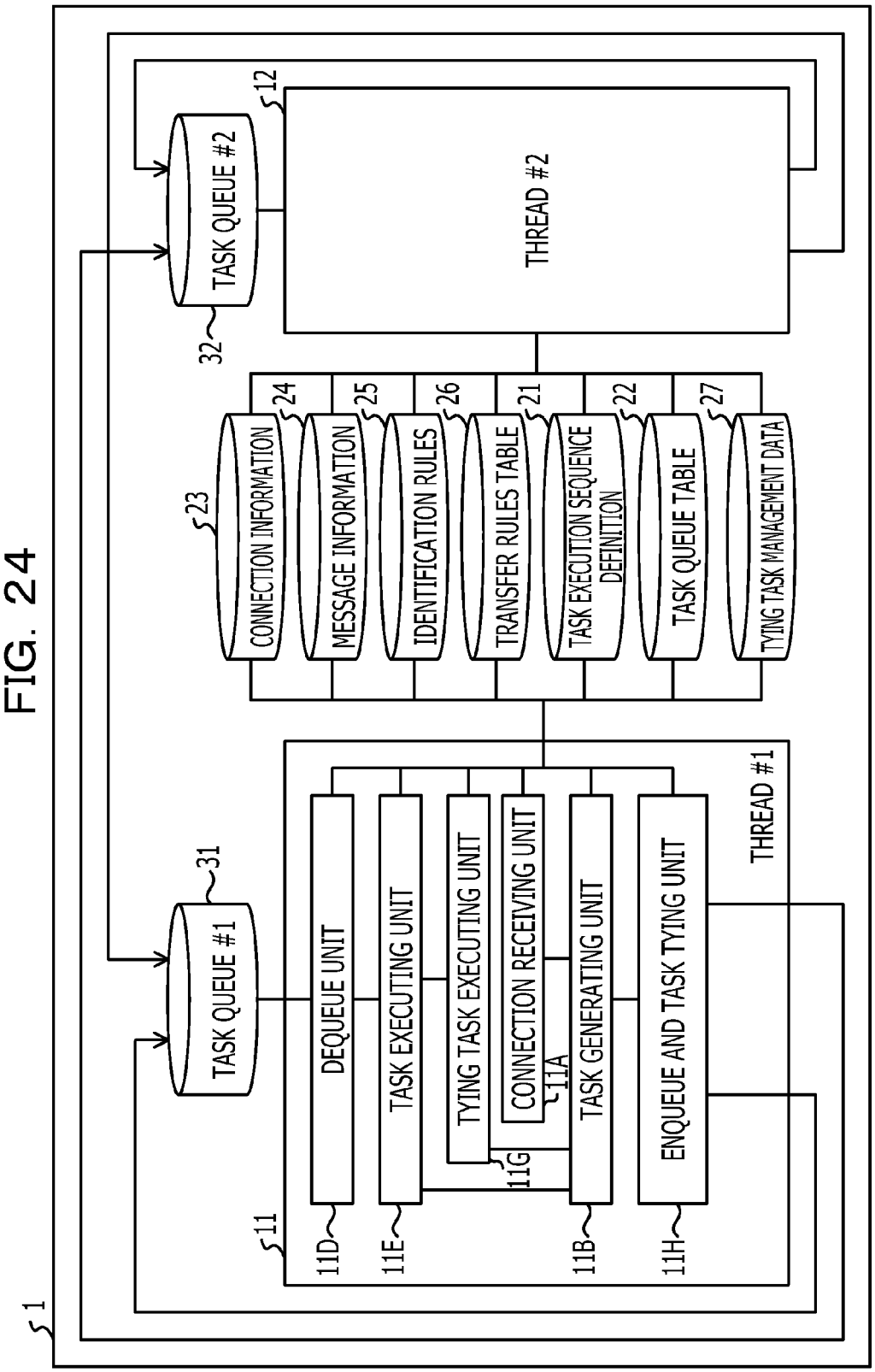
FIG. 24 is a function block diagram of an example of the message relay device.

FIG. 24 is a function block diagram of an example of the message relay device according to the third embodiment. The message relay device according to the third embodiment is different from the message relay device according to the second embodiment. The task tying unit 11F is integrated with the enqueue unit 11C to become an enqueue and task tying unit 11H.

The enqueue and task tying unit 11H includes a function for tying the task management data as well as the function of the enqueue unit 11C according to the second embodiment. That is, the enqueue and task tying unit 11H investigates the queue length of the task queue to enqueue the task to the task queue with the shortest queue length. At this time, the enqueue and task tying unit 11H ties the task management data of the data to be enqueued. In FIG. 24 and the description below, the enqueue and task tying unit is explained as a single function block to clearly describe the difference between the second embodiment and the third embodiment. However, the enqueue and task tying unit may be realized as separate function blocks as the enqueue unit and the task tying unit in the processing sequence for the tying following the enqueue.

FIG. 25 illustrates an example of the tying task management data 27 according to the third embodiment. According to the third embodiment, every time the task is enqueued, the tying is executed on typically the task as the enqueue target. Thus, at least the final position in the investigated task queue is not generally managed. Due to this, as illustrated in FIG. 25, the tying task management data 27 includes the function of the task as the tying target and the tied final task.

4.3 Processing to be Executed by Message Relay Device

The processing that is executed by the message relay device 1 according to the third embodiment will be described.

Figure 26:
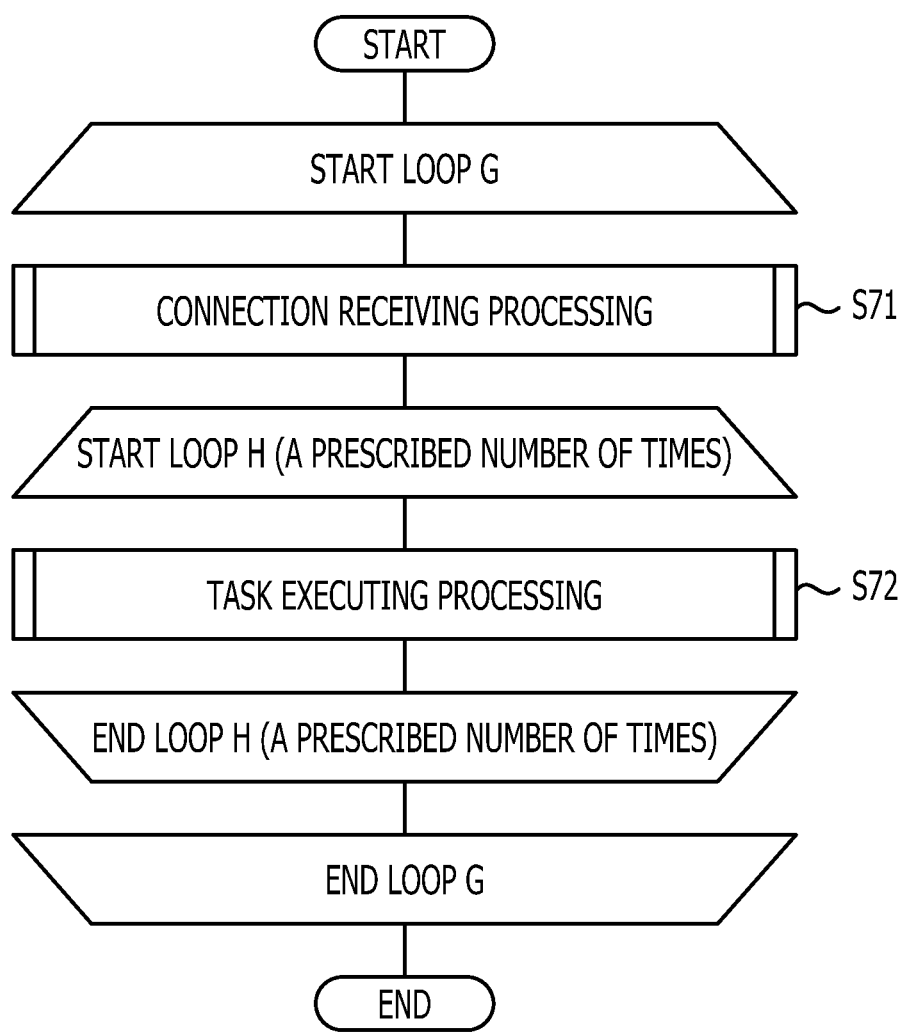
FIG. 26 is a flowchart illustrating an example of the flow of the whole processing executed by each thread.

FIG. 26 is a flowchart illustrating an example of the flow of the whole processing that is executed by each thread. Operations S71 and S72 are repeatedly executed every prescribed period of time (Loop G). In Operation S71, the connection receiving unit 11A, the task generating unit 11B, and the enqueue and task tying unit 11H execute the connection receiving processing.

Operation S72 is repeatedly executed a prescribed number of times (Loop H). In Operation S72, the dequeue unit 11D, the task executing unit 11E, the task generating unit 11B, the enqueue and task tying unit 11H, and the tying task executing unit 11G execute the task executing processing.

The details of the connection receiving processing and the task executing processing are basically equivalent to the second embodiment. Instead of the enqueue unit, the enqueue and task tying unit 11H mainly executes the processing. In Operation S63 of the task executing processing, the enqueue and task tying unit 11H executes the following processing as well as the processing according to the second embodiment.

That is, as with the second embodiment, the enqueue and task tying unit 11H refers to the task queue table 22 to investigate the queue length of all the task queues. The enqueue and task tying unit 11H selects the task queue with the shortest queue length and executes the enqueue of the task generated by the task generating unit 11B on the selected task queue.

At this time, the enqueue and task tying unit 11H refers to the tying task management data 27 to compare the address of the function of the tying target task to the address of the function pointer included in the task data of the task as the enqueue target. If both the address correspond to each other, the enqueue and task tying unit 11H ties the task management data as the enqueue target to the task management data of the tied final task of the tying task management data 27. At this time, after completing the task tying, the enqueue and task tying unit 11H sets the task queue, to which the task as the enqueue target is enqueued, and the set address thereof to the tied final task of the tying task management data 27.

4.4 Effect, Deformation, and the Like According to Third Embodiment

According to the third embodiment, the tying of the task management data of each task is executed at a timing of the enqueue of the task. Therefore, the task that is already enqueued to the task queue to be the execution target may, in principle, be in a state where the tying is surely executed.

The enqueue and task tying unit 11H may execute the tying processing of the task as the enqueue target in the stage of the connection receiving processing.

5. Others

The message relay device described in the embodiments is an example as an application target of the present technique. The present technique may apply to any information processing apparatus if the information processing apparatus that processes the task enqueued to the task queue in association with a plurality of threads, respectively.

The functional configuration and the physical configuration of the information processing apparatus described in the present specification are not limited to the above-described formation. For example, some functions and physical resources may be integrated to be mounted or further dispersed to be mounted.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus which uses an operation system that is capable of giving a plurality of threads an execution opportunity sequentially by a thread switching and which makes a plurality of threads concurrently execute tasks stored in a task queue associated with the thread a prescribed number of times of execution, the information processing apparatus comprising:

a plurality of processors that concurrently execute the plurality of threads without using the thread switching, each of the plurality of threads executing a process, the process including:
generating a task from among a plurality of tasks into which a serial program processing corresponding to a processing request is divided;
selecting a task queue associated with one of the plurality of threads;
enqueuing the generated task to the selected task queue;
tying tasks with a similar function from among the tasks which are enqueued by the task queue associated with the plurality of threads;
dequeuing the enqueued task;
executing a first task stored in one of the plurality of task queues sequentially after executing the dequeued task;
executing a second task stored in the selected task queue sequentially after executing the dequeued task, when the dequeued task is not tied with any of the plurality of tasks; and
tying the executed dequeued task with the first task, when the address of a function of the executed dequeued task corresponds to an address of the function of the first task.

2. The information processing apparatus according to claim 1, wherein the selecting includes:
measuring a queue length of each of a plurality of task queues associated with the plurality of threads; and
selecting the task queue with a shortest queue length among the plurality of task queues based on a result of the measuring.

3. The information processing apparatus according to claim 1, wherein when the task is newly enqueued by the enqueue, the newly enqueued task is tied to the task with the function similar to the function of the task which is newly enqueued from among the tasks enqueued to the task queue associated with the plurality of threads, respectively.

4. The information processing apparatus according to claim 1, wherein the number of the plurality of threads corresponds to the number of cores of the processor of the information processing apparatus.

5. The information processing apparatus according to claim 1, the process further comprising:
executing a third task storing in one of the plurality of task queues sequentially after executing the first task, the third task having a similar function as the executed task and the first task, when the first task and the executed task are tied with the third task.

6. The information processing apparatus according to claim 5,
wherein the executed task and the first task are tied with the third task, after the executed task is tied with the first task.

7. An information processing method of an information processing apparatus which uses an operation system that is capable of giving a plurality of threads an execution opportunity sequentially by a thread switching and which makes a plurality of threads concurrently execute tasks stored in a task queue associated with the thread, the plurality of threads being concurrently executed without using the thread switching by a plurality of processors included in the information processing apparatus, the information processing method which is executed by the respective plurality of threads, the information processing method comprising:
generating a task from among a plurality of tasks into which a serial program processing corresponding to a processing request is divided;
selecting a task queue associated with one of the plurality of threads;
enqueuing the generated task to the selected task queue;
tying tasks with a similar function from among the tasks which are enqueued by the task queue associated with the plurality of threads;
dequeuing the enqueued task;
executing a first task stored in one of the plurality of task queues sequentially after executing the dequeued task;
executing a second task stored in the selected task queue sequentially after executing the dequeued task, when the dequeued task is not tied with any of the plurality of tasks; and
tying the executed dequeued task with the first task, when the address of a function of the executed dequeued task corresponds to an address of the function of the first task.

8. The information processing method according to claim 7, wherein the selecting includes:
measuring a queue length of each of a plurality of task queues associated with the plurality of threads; and
selecting the task queue with the shortest queue length among the plurality of task queues based on a result of the measuring.

9. The information processing method according to claim 7, wherein when the task is newly enqueued by the enqueue, the newly enqueued task is tied to the task with the function similar to the function of the task which is newly enqueued from among the tasks enqueued to the task queue associated with the plurality of threads, respectively.

10. The information processing method according to claim 7, wherein the number of the plurality of threads corresponds to the number of cores of the processor of the information processing apparatus.

11. A non-transitory computer-readable storage medium which stores a program executed in an information processing apparatus for concurrently executing a plurality of threads which executes tasks stored in a task queue associated with the thread, the information processing apparatus being configured to use an operation system that is capable of giving the plurality of threads an execution opportunity sequentially by a thread switching, the plurality of threads being concurrently executed without using the thread switching by a plurality of processors included in the information processing apparatus, the program causes each plurality of threads to execute a method, the method comprising:
generating a task from among the tasks into which a serial program processing corresponding to a processing request is divided;
selecting a task queue associated to one of the plurality of threads;
enqueuing the generated task to the selected task queue;
tying tasks with a similar function from among the tasks which are enqueued by the task queue associated with the plurality of threads;
dequeuing the enqueued task;
executing a first task stored in one of the plurality of task queues sequentially after executing the dequeued task;
executing a second task stored in the selected task queue sequentially after executing the dequeued task, when the dequeued task is not tied with any of the plurality of tasks; and
tying the executed dequeued task with the first task, when the address of a function of the executed dequeued task corresponds to an address of the function of the first task.

12. The non-transitory storage medium according to claim 11, wherein the selecting includes:

measuring a queue length of each of a plurality of task queues associated with the plurality of threads; and selecting the task queue with the shortest queue length among the plurality of task queues based on a result of the measuring.

13. The non-transitory computer-readable storage medium according to claim 11, wherein when the task is newly enqueued by the enqueued, the task with the function similar to the newly enqueued task is tied to the newly enqueued from among the tasks enqueued to the task queues associated with the respective plurality of threads.

14. The non-transitory storage medium according to claim 11, wherein the number of the plurality of threads corresponds to the number of cores of the processors of the information processing apparatus.

* * * * *

UNITED STATES PATENT AND TRADEMARK OFFICE
CERTIFICATE OF CORRECTION

| | | |
|---|---|---|
| PATENT NO. | : 8,966,484 B2 | Page 1 of 1 |
| APPLICATION NO. | : 13/591889 | |
| DATED | : February 24, 2015 | |
| INVENTOR(S) | : Kei Hamada et al. | |

It is certified that error appears in the above-identified patent and that said Letters Patent is hereby corrected as shown below:

On the Title Page

Column 1, Item [75] (inventors), Line 4, delete "Kitakyusyu, (JP);" and insert -- Kitakyushu, (JP); --, therefor.

Signed and Sealed this
Seventh Day of July, 2015

Michelle K. Lee
*Director of the United States Patent and Trademark Office*